Figure 1:
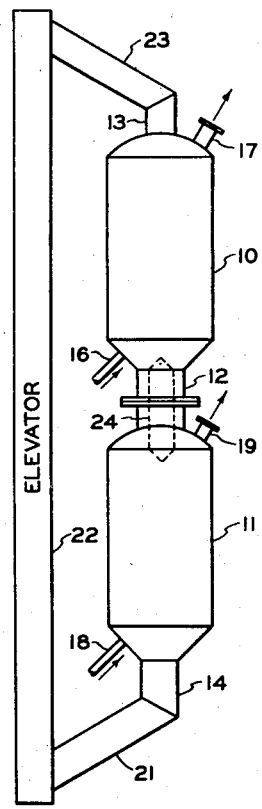

July 11, 1950   S. P. ROBINSON   2,514,722
PEBBLE HEATER THROAT DEVICE
Filed May 9, 1949

INVENTOR.
S. P. ROBINSON
BY Hudson and Young
ATTORNEYS

Patented July 11, 1950

2,514,722

UNITED STATES PATENT OFFICE 2,514,722

PEBBLE HEATER THROAT DEVICE

Sam P. Robinson, Bartlesville, Okla., assignor to Phillips Petroleum Company, a corporation of Delaware Application May 9, 1949, Serial No. 92,208

18 Claims. (Cl. 196—55)

This invention relates to an improved gas-solid heat-exchange apparatus and process. A specific aspect of the invention pertains to an apparatus and process for effecting improved pebble flow through pebble heat-exchangers.

Pebble heat-exchange apparatus has been applied to a wide variety of processes where rapid heating of gases to high temperatures is desirable, including heating of air, nitrogen, steam, and gaseous reactants. In this type of operation, a continuous compact mass of highly refractory pebbles descends by gravity through a series of heat-exchange chambers, absorbing heat from a hot gas, usually combustion gas, in an upper chamber and delivering the heat required for heating and/or chemical reaction in a lower chamber by direct contact with the feed gas therein. In descending from the pebble heating chamber to the gas heating chamber, the pebble stream passes through a relatively narrow neck or throat connecting the chambers. This throat is designed narrow in order to facilitate the prevention of mixing of the contacting gases used in the two chambers. This narrowing of the pebble throat introduces two disadvantages. In the first place, a narrow throat adversely affects the uniformity of pebble flow through the pebble heating chamber which results in uneven heating of the pebbles with possible overheating and fusion of some of the pebbles. In the second place, this narrowing of the pebble throat creates a pebble bed in the lower chamber with a longer slope between the throat and the periphery of the chamber which results in a greater distance of flow of reactants upwardly through the pebble bed in the reactor chamber near the center of the bed, and a shorter distance for reactants passing through the bed near the periphery thereof. The ideal condition for uniform flow of gases through the pebble bed in the reactor is a cylindrical bed having a horizontal top surface. However, this is practically impossible to obtain. The unequal contact time of the reactants with the hot pebbles in the reactor, as just mentioned, results in lower yield of the desired product in cases where a specific reaction time is conducive to the best yield.

The conventional pebble throat is designed rather narrow with respect to the pebble heat-exchange chambers which it connects and is relatively long in order to provide substantial pressure drop between the chambers. The present invention is concerned primarily with an improved pebble throat between pebble heat-exchange chambers of the type just discussed.

The term "pebble" as used throughout this specification denotes any solid refractory contact material, either catalytic or non-catalytic with respect to the process in which it is used, of flowable form and size, and sufficiently rugged and abrasive resistant for use in cyclic heat-exchange processes. Pebbles are preferably substantially spherical and relatively uniform in size in a given process, but may be of other shapes, either regular or irregular and uniform in size. Spheres of about 1/8" to 1" in diameter function desirably in pebble heat exchange processes and those in the range of 1/4" to 5/8" are most practical. Since pebble heat-exchange apparatus has its greatest utility in processes requiring gas heating and/or reaction temperatures upwards of about 1500° F., pebbles must be formed of material that will withstand extremely high temperatures. In some hydrocarbon cracking processes, pebbles must withstand temperatures of 3000° F. or even higher. Serviceable heat and abrasive resistant pebbles have been compacted from alumina, mullite, alumina-mullite, zirconia, magnesia, beryllia, thoria, periclase, natural and synthetic clays, and mixtures of these materials. Spheres formed of high temperature alloys and metals have also been found practical in some processes.

The principal objective of the present invention is to provide a more effective apparatus for and method of gravitating pebbles between heat-exchange chambers while substantially preventing flow of gas therebetween. It is also an object of the invention to provide improved pebble flow through heat-exchange chambers and more uniform distribution of pebbles therein. Another object is to provide an improved throat plug for use in a throat connecting pebble heat-exchange chambers.

Figure 2:
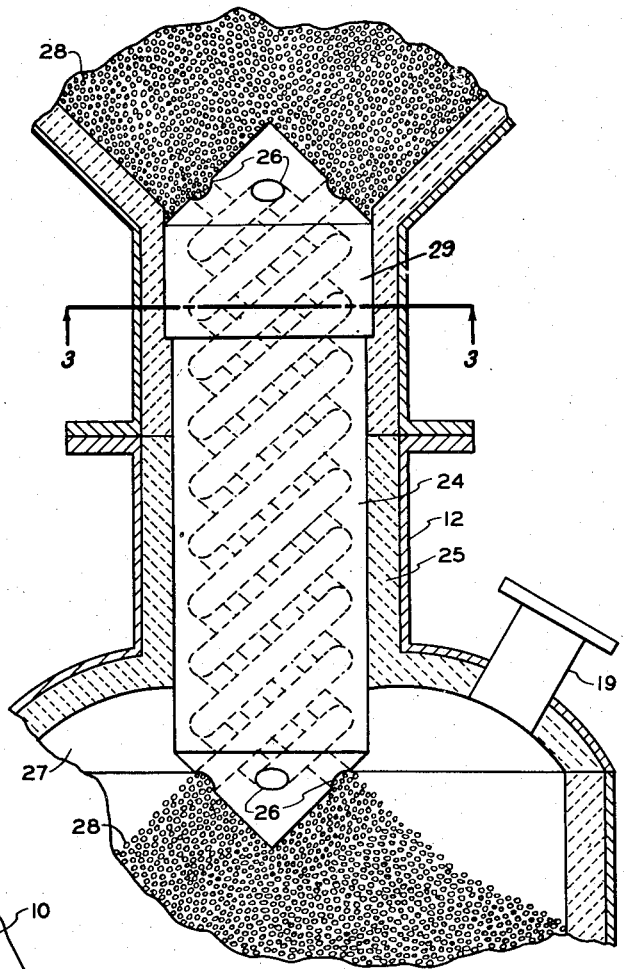
Figure 3:
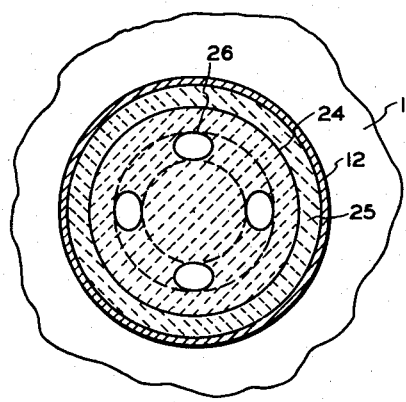

The invention will be more clearly understood by reference to the following detailed description and to the drawing, of which Figure 1 is an elevational view of a pebble heat-exchanger unit with which the invention is concerned; Figure 2 is an elevational view, partially in section, of the throat portion and adjacent sections of pebble heat-exchangers, similar to the arrangement of Figure 1; and Figure 3 is a horizontal cross-section of the throat section of Figure 2 taken on the line 3—3.

To illustrate pebble heat-exchanger operation, reference is made to Figure 1 which shows a pair of heat-exchangers 10 and 11 connected by a throat 12 of restricted cross-section. A pebble inlet conduit 13 admits pebbles to the upper chamber 10 and a pebble outlet conduit 14 serves to withdraw pebbles from the bottom of the lower heating chamber 11. Conduits 16 and 17 are gas inlet and outlet conduits, respectively, for passing a heating gas through chamber 10, and conduits 18 and 19 serve as feed gas inlet and effluent outlet means from the lower chamber 11. A pebble chute 21 connects outlet conduit 14 with the lower end of elevator 22 which transfers pebbles by means of bucket, screw, or air lift to pebble chute 23 connecting with the pebble inlet 13 to the upper chamber 10. In operation, a flow control device (not shown) positioned in pebble chute 21 and operated by an electric motor or equivalent device passes pebbles at a predetermined and regulable rate to the elevator which transfers them to the top of chamber 10 for recycling through the system. In this manner, a contiguous, compact mass of pebbles extending from inlet conduit 13 to the pebble feeder device in chute 21 is maintained at all times during which the apparatus is in operation. The compact mass of pebbles passing through chamber 10 is continuously contacted with a hot gas, usually combustion gas, admitted through line 16 or formed by combustion of fuel in the lower portion of heating chamber 11 or in the pebble bed, in which case the fuel is admitted through line 16 or a plurality of such lines. The cooled heating gas or flue gas is removed through line 17. The gravitating stream of hot pebbles passes through throat 12 and acccording to the invention through the pebble passageways in throat plug or feeder device 24 into gas heating and/or reaction chamber 11 wherein the hot pebbles are contacted, usually in countercurrent flow, by a gaseous stream to be heated and/or reacted, as the case may be.

The apparatus of Figure 1 is applicable to the mere heating of gases to high temperature and to the heating of a gaseous stream consisting of one or more reactants so as to effect either a pyrolytic or catalytic reaction in chamber 11 and the effluents from this reaction are withdrawn for further treatment through line 19. The apparatus is particularly applicable to the conversion of hydrocarbons at temperatures above about 1300° to 1500° F., especially hydrocarbon dehydrogenation and cracking where sharp heating and specific reaction times contribute effectively to the production of high yields of specific hydrocarbons. Specific hydrocarbon conversion reactions which can be effected to advantage in this type apparatus and especially when using the apparatus of the invention, are the cracking of light hydrocarbons to ethylene and acetylene at temperatures in the range of 1500° to 3000° F.

Referring in detail to Figure 2 which shows one modification of the throat plug of the invention in arrangement with pebble heat-exchangers, element 24 is a throat plug or pebble flow control device or body positioned in throat 12 between a pair of pebble heat-exchangers similar to exchangers 10 and 11 of Figure 1. Throat 12 has a refractory lining 25 which also continues around the interior of the pebble heat-exchangers. Throat plug 24 has a plurality of spiral pebble passageways extending between the ends of the plug and designed to permit the steady gravitation of compact streams of pebbles through each from the pebble bed 28 in the upper chamber to the pebble bed 28 in the lower chamber. Plug 24 should be constructed of superior refractory material when it is to be utilized for high temperature operation. For some uses this flow control device may be constructed of high temperature alloy material, such as chrome steel, Monel metal, or inconel. Suitable ceramic materials are high purity aluminum oxide, magnesium oxide, zirconium oxide, silicon carbide, etc.

While the plug shown in Figures 2 and 3 is constructed with four pebble passageways 90° apart around the axis of the plug, any number of pebble passageways may be utilized up to eight or ten, or even more in plugs of considerable diameter in large units. It is advantageous in some installations to use a plug of large diameter having a second concentric ring of pebble passageways traversing the plug nearer its axis than the ring of passageways just inside the periphery.

The width or diameter of plug 24 may vary widely according to the intended use thereof. The optimum advantage of this flow control device is attained by constructing throat 12 and plug 24 of such diameter in relation to the diameter of the pebble heat exchangers that pebble passageways 26 are positioned approximately midway between the axis and the periphery of the chamber. In this manner, optimum flow characteristics of the pebbles in both chambers are provided. However, the plug may be constructed almost as wide as the chambers themselves and the pebble passageways positioned therein at any desirable distance between the axis of the plug and the periphery thereof, it being obvious that the position of the pebble passageways 26 with respect to the axis of the plug and chamber is a determining factor in the type of pebble flow obtained in the pebble chambers.

Pebble passageways 26 have the effect of multiplying the distance between chambers as much as several fold and increase proportionately the pressure drop and therefore the resistance to flow of gas through the pebble passageways from one chamber to the other. These passageways are preferably circular in cross-section and of sufficient diameter (at least 4 or 5 pebble diameters) to permit rapid flow of pebbles therethrough. Pebble flow will depend not only upon the diameter of these passageways, but also upon their steepness or angle of inclination. Vertical pebble passageways passing straight through the plug from end to end are advantages in improving the flow characteristics of the pebbles in the heat exchange chambers but do not attain the advantage of greatly increasing the resistance to gas flow through the passageway by the lengthening effect of the spirals. Of course, any winding or spiraling of the passageways does appreciably increase the resistance to flow of gas and both straight and spiral passageways are within the scope of the invention. The inclination of the passageways should not be so slight as to unduly restrict the flow of pebbles therethrough. The length of the pebble passageways should be such as to substantially eliminate gas flow between chambers under a pressure differential of 0.5 p. s. i., the maximum at which a pebble heater unit is usually operated.

Throat plug 24 is preferably formed with convex ends, such as the conical ends shown in the drawing. Such a cap on the plug aids in directing the flow of pebbles in the upper chamber without forming a stagnant area directly in line with the axis of the plug, while the convex end in the lower chamber prevents the formation of a void space at the end of the plug between the pebble passageway outlets. This void space is detrimental in processes involving the cracking or dehydrogenation of hydrocarbons in this chamber because with carbon formation therein, especially on the end of the plug, due to the "soaking" of hydrocarbon vapors which collect in this void space and avoid quickly passing out of the chamber. Where a cone shape is used for the lower end of the plug the angle of the surface of the cone with the horizontal should be at least as great as the angle of repose of the pebbles so as to avoid the formation of a dead gas space at the end of the plug.

The flow control plug 24 should extend into the lower chamber a short distance so as to provide a gas collecting space between pebble bed 28 and the dome of the chamber thereby facilitating the rapid withdrawal of gas through outlet conduit 19. The size of this gas collecting space 27 is not so important when the apparatus is used merely for the heating of gases which do not react during heating, but may be critical in reaction processes which require specific reaction times and which also require rapid quenching of the reaction products so as to stop further reaction. In cracking ethylene to acetylene at short reaction times and extremely high temperatures which is conducive to maximum yields of acetylene and in order to accurately control the required reaction times in the order of .5 to .01 second, it is extremely essential to maintain as small a gas collecting space between the pebble bed and the dome of the reactor as is consistent with the rapid removal of gases from above the pebble bed through outlet 19. A multiplicity of gas outlets similar to 19 positioned symmetrically around the dome of the reactor may be utilized in processes demanding rapid withdrawal of reaction effluents from gas collecting space 27. Projection of plug 24 into the upper chamber is not essential and its exact positioning relative to the upper end of the throat is not critical. In some cases the plug need not extend entirely to the upper extremity of the throat while in other cases it may extend a short distance into the upper chamber. The upper chamber shown in Figure 2 has a hopper-shaped bottom which assists in obtaining more uniform pebble flow. However, the flow control member 24 of the invention is also applicable to pebble heat-exchangers which have a horizontal bottom.

In order to function properly in preventing passage of gas between the upper and lower heat-exchange chambers, flow control plug 24 must form a gas-tight seal for at least a portion of its length with throat 12 or the refractory lining therein. The plug may be made to form a gas-tight seal in various ways, one of which is shown in Figure 2 whereby the upper end 29 of the plug is of larger diameter than the lower portion so as to form a shoulder at the juncture of the two cylindrical sections of the plug. This shoulder engages a similar shoulder in the throat so as to form a gas-tight seal between the shoulders. This method of construction or design does not require close fitting of the cylindrical sections of the plug with the throat although a relatively close fit is not objectionable where the throat plug and the refractory lining of the throat have approximately equal coefficients of expansion. Another means of suspending plug 24 in throat 12 in fixed relation thereto in gas-tight engagement therewith is to construct the throat and plug of the same cylindrical size and suspend the plug therein with pins or similar devices extended through the throat wall into the plug a short distance. Several of these spaced around the periphery of the plug and throat are sufficient to support the plug. Another method of supporting the plug is by constructing the same with fins thereon, and providing slots in the throat wall which engage the fins when the plug is slipped downwardly into position in the throat. This method of suspending a different type of throat plug is shown in the application of L. J. Weber, Serial No. 715,075, filed December 9, 1946. Any suitable means of supporting the plug in the throat in gas-tight engagement therewith is within the scope of the invention.

Figure 3 shows a horizontal cross-section of the throat of Figure 2 taken on the line 3—3. The elements thereof are numbered in accordance with similar parts or elements in the other figures and the figure is believed self-explanatory.

The throat plug or flow control device of the invention may be manufactured by conventional methods in the ceramic and refractory arts. One method is to cast the plug with volatile or combustible material in the locus of the passageways so that when fired, the passageways will be formed.

While the invention has been described for use in gas heating processes, it is also applicable to the cooling of gases in which the pebbles in the upper chamber are contacted in heat exchange relation with a cold gas and are thereafter contacted in the lower chamber with a gas which is to be cooled as in refrigeration of gases. However, the more common application of the invention is to the heating and/or reacting of gases at elevated temperatures.

I claim:

1. In a throat of restricted cross-section connecting a pair of superposed pebble heat-exchangers adapted for gravitating a contiguous compact mass of pebbles therethrough in heat-exchange relation with different gases in each of said exchangers, a refractory plug coextensive laterally with said throat traversed from end to end by several spiral pebble passageways adapted for gravitating pebbles between said exchangers while obstructing the flow of gases therebetween.

2. In a cylindrical throat of restricted cross-section connecting a pair of superposed pebble heat-exchangers adapted for gravitating a contiguous compact mass of pebbles therethrough in heat-exchange relation with different gases in each of said exchangers, a cylindrical refractory plug coextensive laterally with said throat forming a gas-tight seal therewith and being traversed from end to end by several spiral pebble passageways spaced symmetrically around the axis of said plug.

3. The throat plug of claim 2 having convex ends extending into the adjacent heat-exchange chambers a minor portion thereof.

4. The throat plug of claim 2 having a convex conical lower end extending into the upper end of the lower heat-exchange chamber a short distance so as to form a relatively small vapor space therein above a bed of pebbles formed when gravitating a compact mass of pebbles through said chambers and passageways.

5. A flow-control device for controlling the flow of pebbles and obstructing the flow of gas between superposed gas-solid contacting chambers connected by a throat, comprising an elongated refractory body having several spiral passageways for pebbles extending from end to end thereof and adapted in size and shape to fit into said throat in gas-tight engagement therewith.

6. A flow-control device for controlling the flow of pebbles and obstructing the flow of gas between superposed gas-solid contacting chambers connected by a cylindrical throat, comprising a generally cylindrical refractory body traversed by several pebble passageways from end to end, said passageways being symmetrically disposed around the axis of said body near the periphery thereof, and said body being adapted to engage the wall of said throat in gas-tight relation.

7. The device of claim 6 having a convex lower end.

8. A flow-control device for controlling the flow of pebbles and obstructing the flow of gas between superposed gas-solid contacting chambers connected by an elongated cylindrical throat, comprising an elongated refractory body having cylindrical sections at either end thereof of different diameters so as to form a shoulder at the juncture of said sections, adapted to support said body and form a gas-tight seal with a throat of similar shape, and being traversed from end to end by several spiral pebble passageways of circular cross-section disposed symmetrically around the axis of said body and spaced apart therefrom.

9. The device of claim 8 having a convex lower end.

10. In combination a pair of heat-exchange chambers adapted for gravity flow of pebbles therethrough in series and connected by a throat of small horizontal cross-section than either of said chambers; a flow-control member in said throat engaging the wall thereof in gas-tight manner so as to prevent flow of gas between said member and said wall; and several spiral pebble passageways of a circular cross-section of several pebble diameters traversing said member from upper to lower end, being adapted to gravitate pebbles between said chambers while preventing flow of gas therebetween.

11. In combination a pair of heat-exchange chambers adapted for gravity flow of pebbles therethrough in series and connected by an elongated upright cylindrical throat of lesser diameter than either of said chambers; a cylindrical refractory flow-control plug in said throat coextensive therewith and forming a gas-tight seal therewith; and several spiral pebble passageways several pebble diameters in cross-section traversing said plug from end to end in symmetrical arrangement around the axis thereof.

12. The apparatus of claim 11 in which the ends of said plug are convex.

13. The apparatus of claim 11 in which the lower end of said plug extends a short distance into the upper end of the lower chamber so as to provide a vapor space above the pebble bed when pebbles are gravitated through said chambers and passageways.

14. The apparatus of claim 11 in which said throat and said plug are of larger diameter in the upper section than in the lower section so as to form shoulders on said plug and in the wall of said throat which engage as supporting means for said plug and gas-sealing means between said throat and plug.

15. A method of gravitating pebbles between a pair of superposed gas-solid contacting zones wherein a different gas is contacted in each zone with a gravitating stream of pebbles without substantial mixing of the gases, comprising gravitating said pebbles in compact streams through several narrow spiral pebble passageways extending between said zones through a vertically elongated solid zone connecting said contacting zones.

16. The method of claim 15 in which the pebbles are spheres of a diameter in the range of 1/8" to 1" and said spiral passageways are circular in cross-section, several pebble diameters across, and symmetrically disposed around the perpendicular axis of said solid zone in spaced-apart relation thereto.

17. In a process involving the steps of contacting a gravitating compact mass of pebbles in an upper gas-solid contacting zone with a gas in heat-exchange relation and thereafter contacting the gravitating compact pebble mass in a lower gas-solid contacting zone with a different gas in heat-exchange relation, the improvement comprising gravitating said compact mass in separate compact streams through a plurality of spiral passageways of relatively small circular cross-section traversing a gas-impervious elongated solid connecting zone extending between said contacting zones so as to prevent substantial flow of gases between said contacting zones.

18. A process for the conversion of hydrocarbons which comprises gravitating a compact contiguous stream of pebbles successively through a pair of heat-exchange zones separated by a pebble flow-control and gas-sealing zone; contacting said pebbles in the upper of said heat-exchange zones with a stream of hot gas so as to heat said pebbles to a temperature above a predetermined conversion temperature in the range of 1500° to 3000° F.; contacting the heated pebbles in the lower of said heat exchange zones with a stream of hydrocarbon so as to heat the same to said predetermined conversion temperature and effect conversion thereof; gravitating pebbles through said pebble flow-control zone in several compact streams through several spiral pebble passageways of circular cross-section several pebble diameters in diameter, the length of said last-named zone and said pebble passageways being sufficient to substantially eliminate gas flow between said heat-exchange zones under pressure differentials up to 0.5 p. s. i.; and recovering hydrocarbon effluent from the lower heat-exchange zone.

SAM P. ROBINSON.

No references cited.